United States Patent [19]
Someda et al.

[11] Patent Number: 6,100,001
[45] Date of Patent: Aug. 8, 2000

[54] NITRILE RESIN FOR ELECTRO-PHOTOGRAPHIC CARRIER AND PREPARATION PROCESS THEREOF

[75] Inventors: Makoto Someda; Masahiro Kaneko; Mitsuo Kawata; Kyoji Kuroda; Hiroaki Narisawa; Shinichi Asai, all of Aichi-ken, Japan

[73] Assignee: Mitsui Chemicals, Inc., Japan

[21] Appl. No.: 09/066,811

[22] Filed: Apr. 28, 1998

[30] Foreign Application Priority Data

May 7, 1997 [JP] Japan ..................................... 9-117047

[51] Int. Cl.⁷ ..................................................... C03G 9/107
[52] U.S. Cl. ........................... 430/108; 525/309; 525/310; 525/329.3; 525/942; 524/439
[58] Field of Search ..................................... 525/242, 309, 525/310, 329.3, 942; 524/439; 430/108

[56] References Cited

U.S. PATENT DOCUMENTS 3,846,509  11/1974  Saluti .

FOREIGN PATENT DOCUMENTS

| 0052259 | 5/1982 | European Pat. Off. . |
| 2090872 | 1/1972 | France . |
| 4235505 | 4/1994 | Germany . |
| 8-151417 | 8/1996 | Japan . |
| 1435605 | 5/1976 | United Kingdom . |

*Primary Examiner*—Jeffrey Mullis
*Attorney, Agent, or Firm*—Burns, Doane, Swecker & Mathis, L.L.P.

[57] ABSTRACT

A nitrile resin for a carrier resulting from graft-copolymerization of 100 parts by weight of a monomer mixture containing unsaturated nitrile and alkyl acrylate in the presence of 1 to 30 parts by weight of a rubber-like polymer containing 50% by weight or more of conjugated diene units. The nitrile resin comprises having a glass transition temperature of 50 to 69° C., having a matrix component except rubber ingredient containing 45 to 80% by weight of unsaturated nitrile units and 20 to 55% by weight of alkyl acrylate units and having a weight average molecular weight of 30,000 to 150,000. The invention further relates to a preparation process of nitrile resin and an electrophotographic carrier containing the nitrile resin. The nitrile resin for a carrier of the invention has an excellent processing ability in the carrier preparation step and good balance of electrostatic charge stability of the carrier. Consequently, the resin is highly suitable for use in the electrophotographic carrier.

9 Claims, No Drawings

NITRILE RESIN FOR ELECTRO-PHOTOGRAPHIC CARRIER AND PREPARATION PROCESS THEREOF

FIELD OF THE INVENTION

The present invention relates to nitrile resin for a carrier, a preparation process thereof, and a carrier comprising said nitrile resin for the carrier. More particularly, the invention relates to a carrier nitrile resin wherein the resin composition and glass transition temperature are specific and the weight average molecular weight of matrix components except a rubber ingredient is in a specific range, a preparation process thereof, and an electro-photographic carrier comprising said carrier nitrile resin.

The nitrile resin for the carrier of the invention has good processing ability in the preparation step of a carrier used for electro-photography and is excellent in electro-static charge stability as a carrier.

PRIOR ART OF THE INVENTION

Conventionally, a developer obtained by mixing an insulating toner with a magnetic carrier which was prepared as intact from iron and/or ferrite has been used in order to visualize an electro-static latent image in image forming apparatus such as electro-photography.

However, generally in such type of the developer, a magnetic brush had a hard spike and has generated strips nonuniformity and provided other problems in a developing step. Further, the carrier itself had a low volume resistivity and thus the electro-static charge on an electro-static latent image former was blown off by way of the carrier and caused problems such as generation of deficiency and turbulence on the image or adhesion of the carrier to the electro-static latent image due to the charge injected from a developing sleeve. Consequently, in order to overcome disadvantages of the conventional carrier consisting of iron, ferrite and other magnetic simple substances, a binder-type carrier prepared by dispersing a magnetic fine powder in resin has been proposed in U.S. Pat. No. 4,284,702 and put to practical use.

The resin which can be used for the binder has a carboxyl, hydroxyl, glycidyl, amino and other polar group in view of binding property with and dispersing property of the magnetic powder. However, the resin is poor in moisture resistance and cannot provide consistent electrostatic charge for the toner over a long period of time. As a result, the resin is liable to generate scattering, fogging, soiling and other problems of the toner.

In order to solve these problems, it has been proposed to use resin comprising acrylonitrile as a copolymerization ingredient.

For example, Japanese Laid-Open Patent HEI 8-44119 has disclosed an electro-photographic carrier prepared from resin comprising acrylonitrile as a copolymerization ingredient and a preparation process thereof. However, these resins have a glass transition temperature of 70 to 200° C. and thus processing ability of these resins is unsatisfactory in the carrier preparation step.

SUMMARY OF THE INVENTION

One object of the invention is a resin resulting from graft copolymerization of unsaturated nitrile and alkyl acrylate in the presence of a rubber-like polymer, to restrict glass transition temperature of the resin and weight average molecular weight of a matrix component within a specific range, to make a carrier nitrile resin kneadable under reduced load and dispersible with ease in the carrier preparation step, and to provide excellent electro-static charge stability for the carrier while maintaining binding property with and dispersibility of the magnetic powder; and to provide a preparation process thereof and an electro-photographic carrier comprising said nitrile resin.

As a result of an intensive investigation in order to achieve the above objects, the present inventors have found that the carrier resin which can conform to the above objects is nitrile resin which can be obtained by graft-copolymerizing 100 parts by weight of a monomer mixture comprising unsaturated nitrile and alkyl acrylate in the presence of 1 to 30 parts by weight of a rubber-like polymer comprising 50% by weight or more of conjugated diene units, and that the nitrile resin has a glass transition temperature of 50 to 69° C., the matrix component except rubber ingredient of said nitrile resin comprises 45 to 80% by weight of unsaturated nitrile units and 20 to 55% by weight of alkyl acrylate units and has a weight of average molecular weight of 30,000 to 150,000.

The present inventors have further found that the carrier nitrile resin which can conform to the above objects can be obtained in the graft-copolymerization of the above monomer mixture by carrying out specific methods for addition of the monomer mixture and a molecular weight controller and for regulation of pH in the reaction system.

That is, the first aspect of the invention is a nitrile resin for a carrier obtained by graft-copolymerizing 100 parts by weight of a monomer mixture comprising unsaturated nitrile and alkyl acrylate in the presence of 1 to 30 parts by weight of a rubber-like polymer comprising 50% by weight or more of conjugated diene units, wherein the nitrile resin has a glass transition temperature of 50 to 69° C., has 45 to 80% by weight of the unsaturated nitrile units and 20 to 55% by weight of the alkyl acrylate units and has a weight average molecular weight of 30,000 to 150,000 in the matrix component except the rubber ingredient of said nitrile resin.

The second aspect of the invention is a preparation process of carrier nitrile resin by graft-copolymerizing in an aqueous medium 100 parts by weight of a monomer mixture comprising 45 to 80% by weight of unsaturated nitrile and 20 to 55% by weight of alkyl acrylate in the presence of 1 to 30 parts by weight of a rubber-like polymer comprising 50% by weight or more conjugated diene units, that is, a preparation process of the carrier nitrile resin comprising:

(1) using 1 to 10 parts by weight of a molecular weight controller for 100 parts by weight of a monomer mixture, (2) adding 15 to 30 parts by weight of the monomer mixture and 5% by weight or more for the total amount of a molecular weight controller to the polymerization system, and simultaneously regulating the polymerization reaction system to pH 2 to 4, (3) staring the polymerization reaction by addition of a polymerization initiator to the polymerization reaction system, and successively, (4) starting to continuously add 70 to 85 parts by weight of the residual monomer mixture and less than 95% by weight for the total amount of residual molecular weight controller to the polymerization reaction system, (5) until 80 to 90% by weight of the total monomer mixture is converted, (5-1) continuously adding the residual monomer mixture so as to obtain 0.05 to 0.45 in the ratio of residual monomer mixture in the polymerization reaction system to the total amount of the monomer mixture added to the polymerization reaction system, and (5-2) continuously adding the molecular weight controller while regulating the polymerization reaction system to pH 2 to 4.

Further, the third aspect of the invention is an electrophotographic carrier comprising the nitrile resin for the carrier of the above first invention.

The first invention is characterized by restricting the nitrile resin to result from graft-copolymerization of unsaturated nitrile and alkyl acrylate in the presence of a specific amount of rubber-like polymer and to have a glass transition temperature of 50 to 69° C. and a weight average molecular weight of the matrix component except rubber ingredient of 30,000 to 150,000.

The second invention is characterized in the preparation of resin having the above composition by adding as an initial charge (referred to as initial addition) a specific amount of a monomer mixture and molecular weight controller to the reaction system in the presence of a rubber-like polymer and regulating pH of the reaction system within a specific range and successively starting copolymerization by addition of a polymerization initiator, and also characterized by progressing the copolymerization through continuous addition of residual monomer mixture and molecular weight controller to the reaction system after starting the copolymerization (referred to as post addition) until the conversion rate of monomer mixture reaches 80 to 90% by weight while regulating the pH of the reaction system within a specific range. It is also important to carry out post addition of the monomer mixture continuously with a velocity so as to obtain 0.05 to 0.45 in the ratio of residual monomer mixture in the reaction system to the amount of monomer mixture used.

In the nitrile resin for the carrier of the invention, the composition of unsaturated nitrile, alkyl acrylate and rubber-like polymer is balanced, the glass transition temperature is restricted within a specific range, and the weight average molecular weight of the matrix component except rubber ingredient is limited to a specific range. Thus the resin is excellent in the processing property in the carrier preparation step and electrostatic charge stability of the carrier. Consequently, the nitrile resin for the carrier of the invention is very useful as a carrier resin used for electro-photography.

Further, in the present invention, the term "continuous addition" of a monomer mixture to the reaction system means that addition of the prescribed amount of monomer mixture is continuously or intermittently carried out from the prescribed point in time of initiation to the prescribed point in time of termination. However, an intermittent addition having an interval of about 15 minutes or less is involved in the continuous addition. Preferred methods of continuous addition include addition methods employing a centrifugal pump or a plunger pump. When the amount of addition per unit time is small in these methods, the state of discontinuous addition due to pulsation of the pump can be permitted with safety.

The term "rubber ingredient" in the invention refers to a rubber-like polymer and a polymer obtained by grafting unsaturated nitrile or other monomers on the rubber-like polymer. The term "matrix component" refers to component consisting of monomer units except rubber ingredient. The glass transition temperature and the weight average molecular weight of matrix component indicate values measured with the methods shown in the examples below.

The term "overall conversion rate" refers to a conversion rate to a polymer on the basis of the whole amount of the monomer mixture totally charged to the polymerization system.

DETAILED DESCRIPTION OF PREFERRED EMBODIMENTS

The invention will be hereinafter illustrated in detail.

The carrier nitrile resin of the invention can be obtained by the process shown below. The graft copolymerization of unsaturated nitrile and alkyl acrylate in the presence of a rubber-like polymer initiates for the first time by adding the prescribed amount of a monomer mixture and a molecular weight controller to the reaction system, regulating pH of the reaction system, and successively by adding a polymerization initiator. Thereafter, the residual monomer mixture and molecular weight controller are continuously added to the reaction system, and further, the molecular weight controller is continuously added until an overall conversion rate of the monomer mixture reaches 80 to 90% by weight while adjusting the pH of the reaction system to progress the copolymerization.

Polymerization processes which can be applied include emulsion polymerization, solution polymerization, suspension polymerization, bulk polymerization, combination of these polymerizations, and other known polymerization processes. However, emulsion polymerization is preferably applied in view of ease in polymerization heat removal and post treatment after polymerization and simplicity in auxiliary facilities for recovery and regeneration of organic solvents. In the case of emulsion polymerization, polymerization products can be obtained in the form of latex, and thus conventionally known processes can be employed. For example, the polymerization product can be coagulated and separated by an aggregation method using an electrolyte or solvent or by a freezing method, washed with water, and dried to obtain the polymer.

The rubber-like polymer which can be used in the invention is a polymer consisting of conjugated diene alone, or a copolymer consisting of conjugated diene and copolymerizable monomer, for example, unsaturated nitrile, aromatic vinyl compound, unsaturated carboxylate ester and other monomers, and mixtures of them.

Exemplary conjugated diene includes 1,3-butadiene, isoprene, chloroprene, 2,3-dimethyl-1,3-butadiene, and 2,3-diethyl-1,3-butadiene. 1,3-Butadiene and isoprene are preferred in view of ease in acquisition and good property in polymerization. Unsaturated nitrile includes, for example, acrylonitrile, methacrylonitrile, and α-chloroacrylonitrile. Acrylonitrile and methacrylonitrile are preferably used. Aromatic vinyl compounds include styrene and α-methylstyrene. Unsaturated carboxylate ester includes acrylate or methacrylate alkyl ester having 1 to 4 carbon atoms. Methyl acrylate, ethyl acrylate, methyl methacrylate and ethyl methacrylate are preferably used.

Representative rubber-like polymers which can be favorably used include poly-1,3-butadiene, 1,3-butadiene/acrylonitrile copolymer, 1,3-butadiene/acrylonitrile/methacrylonitrile copolymer, 1,3-butadiene/acrylonitrile/styrene copolymer and 1,3-butadiene/styrene copolymer. Poly-1,3-butadiene, 1,3-butadiene/acrylonitrile copolymer and 1,3-butadiene/styrene copolymer are more favorably used.

The amount of conjugated diene comprised in the rubber-like polymer relates to impact resistance of resulting nitrile resin and gives effect on the durability of carrier prepared from the resin. In view of such influence, conjugated diene is preferably comprised in 50% by weight or more.

Impact resistance of the resin and durability of the carrier are improved with increase in the amount of rubber-like polymer used in graft-copolymerization. On the other hand, too much amount of the rubber-like polymer decreases processing ability in the carrier preparation step and tends to increase in forming floc and deposit on the polymerizer wall. In view of these points, the amount of rubber-like polymer used in copolymerization is preferably 1 to 30 parts by weight and the proportion of rubber-ingredient in the nitrile resin is preferably 1 to 50% by weight.

Rubber-like polymer can be prepared by known methods, suitably by emulsion polymerization. No particular limitation is imposed upon the polymerization temperature. However, temperature in the range of 30 to 70° C. is preferred in view of polymerization velocity and productivity.

The invention uses unsaturated nitrile and alkyl acrylate as requisite monomers and, when necessary, other copolymerizable monomers can also be used in combination.

Exemplary nitrile which can be used in the invention includes acrylonitrile, methacrylonitrile and α-chloroacrylonitrile. Acrylonitrile and methacrylonitrile are preferably used.

Representative alkyl acrylate includes methyl acrylate, ethyl acrylate, propyl acrylate and butyl acrylate. Preferred acrylate is methyl acrylate and ethyl acrylate.

Copolymerizable other monomers which can be used include, for example, alkyl methacrylate, aromatic vinyl compound, vinyl ether and α-olefin. Specific alkyl methacrylate includes methyl methacrylate, ethyl methacrylate, propyl methacrylate and butyl methacrylate. Specific aromatic vinyl compound includes styrene, α-methylstyrene, vinyltoluene, and vinylxylene. Specific vinyl ester includes vinyl acetate, vinyl propionate and vinyl butyrate. Specific vinyl ether includes methyl vinyl ether, ethyl vinyl ether, propyl vinyl ether, butyl vinyl ether, methyl isopropenyl ether and ethyl isopropenyl ether. Specific α-olefin includes isobutene, 2-methyl-1-butene, 2-methyl-1-pentene, 2-methyl-1-hexene, 2-methyl-1-heptene, 2-methyl-1-octene, 2-ethyl-1-butene and 2-propyl-1-butene.

Properties of nitrile resin as a carrier is affected by the amount of unsaturated nitrile comprised in the matrix component except rubber ingredient. That is, smaller amount of unsaturated nitrile affects electrostatic charge stability of the resulting carrier and binding property and dispersing ability of the magnetic powder. On the other hand, too large an amount of unsaturated nitrile decreases processing ability. In view of these points, matrix component comprises preferably 45 to 80% by weight, more preferably 50 to 80% by weight of unsaturated nitrile.

The properties of resulting nitrile resin as a carrier changes also depending upon the series and amount of the alkyl group. In view of electrostatic charge stability and durability of the carrier prepared from the nitrile resin of the invention, acrylate ester having an alkyl group of 1 to 4 carbon atoms in preferably used. Methyl acrylate and ethyl acrylate are preferred in particular.

The amount of alkyl acrylate affects properties of the nitrile resin and resulting carrier. Specifically, when the proportion of alkyl acrylate comprised in the matrix component except rubber ingredient is less than 20% by weight, impact resistance of the resin and durability of the carrier are decreased. On the other hand, the amount exceeding 55% by weight lowers glass transition temperature, impairs blocking property of a resulting developer, makes amount of electrostatic charge unstable and also affects binding ability and dispersing property of magnetic powder. In consideration of the above view points in the invention, alkyl acrylate comprised in the matrix component is preferably 20 to 55% by weight, more preferably 20 to 50% by weight.

When other copolymerizable monomer is used, the amount of the monomer is 20% by weight or less of the matrix component except rubber ingredient. The amount of 20% by weight or less gives not so much effect on the properties of nitrile resin. No particular restriction is imposed upon the type of other monomer. However, in view of processing ability and electrostatic charge stability of resulting nitrile resin, preferred monomers are styrene, α-methylstyrene and methacrylate of alkyl having 1 to 4 carbon atoms.

When nitrile resin is used, processing ability in the carrier preparation step and electrostatic charge stability and durability of resulting carrier are affected, as mentioned above, by type and amount of the rubber-like polymer, amount of unsaturated nitrile and alkyl acrylate in the matrix component except rubber ingredient and amount of other copolymerizable monomers. Further, these properties are also affected by the glass transition temperature of nitrile resin and the weight average molecular weight of matrix component except rubber ingredient.

When the glass transition temperature of nitrile resin is lower than 50° C., the resulting developer impairs blocking property and amount of electrostatic charge becomes unstable. On the other hand, the glass transition temperature exceeding 69° C., processing ability lowers in the carrier preparation step. In view of these points, the nitrile resin preferably has a glass transition temperature of 50 to 69° C.

When the weight average molecular weight of matrix component except rubber ingredient in the nitrile resin is less than 30,000, impact resistance of the resin and also durability of the carrier are lowered. On the other hand, the weight average molecular weight exceeding 150,000 lowers flowability of the resin and processing ability in the carrier preparation step. In consideration of these points, the weight average molecular weight of matrix component except rubber ingredient is preferably 30,000 to 150,000, more preferably 30,000 to 90,000 in view of processing ability.

As a result of these view points, the resin used in the invention is required to have a glass transition temperature of 50 to 69° C., and a weight average molecular weight of matrix component except rubber-ingredient of 30,000 to 150,000 in order to balance processing ability in the carrier preparation step and electrostatic charge stability and durability of resulting carrier in a practical range.

The carrier nitrile resin of the invention is obtained by carrying out graft-copolymerization of the above monomers in the presence of a rubber-like polymer and has a specific glass transition temperature and specific weight average molecular weight of matrix component except rubber ingredient.

In order to control the glass transition temperature and the weight average molecular weight of matrix component except rubber ingredient to the above range in the preparation process of the nitrile resin in the invention, it is important to restrict addition of the monomer mixture and the molecular weight controller to the method described below and simultaneously to maintain pH of the polymerization system in a specific range.

That is, 15 to 30 parts by weight in the 100 parts by weight of the whole monomer mixture are added as an initial portion before starting polymerization. The addition can be carried out continuously or batchwise. When the amount of initially added monomer mixture is less than 15 parts by weight, activity of the polymerization system lowers after initiating polymerization and graft polymerization upon the rubber-like polymer does not progress properly. Thus, impact resistance of the resin decreases and affects durability of the resulting carrier. On the other hand, the amount exceeding 30 parts by weight gives influence on the reaction stability such as removal of polymerization heat, formation of floc and generation of deposit on a polymerizer wall.

As to the remainder of the monomer mixture, 70 to 85 parts by weight is continuously added as a post addition after starting the polymerization reaction. That is, continuous addition of residual monomer mixture starts after addition of a polymerization initiator. Further, it is important to control the addition velocity until overall conversion rate of the monomer mixture reaches 80 to 90% by weight. In practice, the residual monomer mixture is continuously added in such a velocity that the ratio of unreacted monomer mixture in the polymerization system to the whole amount of the monomer mixture used is maintained in the range of 0.05 to 0.45 until the above conversion rate is reached.

When the ratio of the amount of unreacted monomer mixture in the polymerization system exceeds the above range, the formed amount of floc and deposit on the polymerizer wall is liable too increase.

On the other hand, when the ratio of the amount of residual monomer mixture in the polymerization system is less than the above range, polymerization cannot progress smoothly.

In the graft copolymerization of the invention, the composition of the monomer mixture comprising unsaturated nitrile and alkyl acrylate as requisite ingredients gives direct influence on the finally formed matrix composition except rubber ingredient. That is, the composition of monomer mixture reflects in a similar form to the matrix composition except rubber ingredient.

Molecular weight controller is used in an amount of 1 to 10 parts by weight for 100 parts by weight of the monomer mixture. Before starting polymerization, 5% by weight or more, preferably 5 to 30% by weight of molecular weight controller is added as initial addition. Addition can be carried out continuously or batchwise. The residual portion can be continuously added as post addition after starting polymerization. Continuous addition finishes when the overall conversion rate of monomer mixture reaches 80 to 90% by weight. When the initially added molecular weight controller is less than 5% by weight, the polymer formed in the early stage has a large molecular weight and gives influence on the flowability of resulting resin, and further increases molecular weight of the polymer which grafts on the rubber-like polymer and affects the flowability of resulting resin. On the other hand, the amount of initially added molecular weight controller exceeding 30% by weight lowers activity of the polymerization system at the period immediately after starting polymerization. When addition of the molecular weight controller finishes before attaining to 80% by weight of overall conversion rate of monomer mixture, the polymer formed in the late stage of the polymerization reaction has a large molecular weight and gives influence on the flowability of resulting resin. On the other hand, when addition of the molecular weight controller finishes after attaining to 90% by weight of overall conversion rate of monomer mixture, the effect on the molecular weight control is small. However, an additional amount of molecular weight controller is used.

In order to enhance molecular weight controlling effect by activating the molecular weight controller, the invention regulates the polymerization system in the range of pH 2 to 4 by addition of acids. That is, initial portion of the monomer mixture and molecular weight controller is added in an aqueous medium in presence of rubber-like polymer and successively pH of the polymerization system is regulated in the range of pH 2 to 4. Thereafter, copolymerization is started by adding the polymerization initiator. That is, the instant of adding the polymerization initiator is the initiation time of copolymerization of the invention. After starting copolymerization, pH of the polymerization system is regulated in the range of 2 to 4 until the overall conversion rate of monomer mixture reaches 80 to 90% by weight.

When the pH of the polymerization system is less than 2, activity of the polymerization system becomes too low and unfavorably leads to corrosion of facility. Further, emulsion stability of the rubber-like polymer decreases and causes coagulation and deposition of rubber. On the other hand, in the polymerization system exceeding pH 4, the molecular weight controller cannot fully exert its effect, a large amount of high molecular weight polymer is formed, and the resulting resin decreases flowability. Furthermore, when the pH of the polymerization system deviates from the above range before the monomer mixture attains overall conversion rate of 80% by weight, the function of molecular weight controller can not sufficiently be exhibited. When the pH of the polymerization system deviates from the above range after the overall conversion rate exceeding 90% by weight, the effect on the molecular weight control is small. However an additional amount of pH regulator is used.

No particular restriction is imposed upon the polymerization initiator used in the invention. Known radical polymerization initiators can be used. Exemplary initiators include benzoyl peroxide, lauroyl peroxide and other organic peroxides; azobisisobutyronitrile and other azo compounds; potassium persulfate, sodium persulfate, ammonium persulfate and other persulfates; and hydrogen peroxide. When emulsion polymerization is carried out, potassium persulfate, sodium persulfate, ammonium persulfates and other persulfates, and hydrogen peroxide are preferably used.

Exemplary molecular weight controllers include alkyl mercaptans, for example, n-dodecyl mercaptan, tert-dodecyl mercaptan, n-dodecylthiol acetate, pentaerythritoltetrakis ($\beta$-mercaptopropionate) and limonene dimercaptan. In these compounds, organic mercapto compounds having two or more mercapto groups in a molecule, for example, pentaerythritoltetrakis ($\beta$-mercaptopropionate) and limonene dimercaptan are preferably used because of substantially no mercaptan odor.

Exemplary pH regulators for regulating pH of the polymerization system include are inorganic and organic acids and include, for example, phosphoric acid, sulfuric acid, hydrochloric acid, hydrobromic acid, nitric acid and other inorganic acids; and acetic acid, propionic acid, citric acid, 3-mercaptopropionic acid, ascorbic acid and hydrogen phosphate ester. Preferred acids are acetic acid, citric acid, phosphoric acid, and 3-mercaptopropionic acid.

Addition method of the polymerization initiator and pH regulator to the polymerization system can be exemplified batchwise addition, continuous addition and combination of these addition method. The polymerization initiator can be added batchwise or continuously. The pH regulator is preferred to add continuously.

On starting the polymerization, initial portion of the monomer mixture, rubber-like polymer and other auxiliary materials are charged to the polymerization system and successively the polymerization system is deoxidated with stirring, heated to the prescribed polymerization temperature, stabilized at the temperature, and thereafter polymerization initiator is added.

The amount of polymerization initiator is preferably 0.02 to 0.2 part by weight for 100 parts of the monomer mixture. The amount of acid used for a pH regulator can maintain the pH of polymerization system in the above range and is generally 0.1 to 0.6 parts by weight for 100 parts by weight of the monomer mixture.

Moreover, emulsifiers and dispersants are used for the polymerization. The species and amounts of these materials are already known. Known methods are also applied to the post treatment and drying of the polymerization product. No particular limitation is imposed on the polymerization temperature. The polymerization can be carried out in an arbitrary temperature from 0 to 100° C., preferably in the range of 30 to 70° C. in view of polymerization velocity, conversion rate and productivity. Plasticizers, stabilizers, lubricants, dyes and pigments, and fillers can be added after finishing polymerization, if necessary.

The resin prepared by the above method has electrostatic charge stability and durability when used as a carrier and is also excellent in the processing ability in the carrier preparation step, and thus is a novel resin having an extremely high practical value.

Next, the electro-photographic carrier of the invention will be illustrated.

The electro-photographic carrier of the invention comprises nitrile resin of the invention and magnetic powder as main components.

Materials which can be used as the magnetic powder can be magnetized when put in a magnetic field, and include, for example, iron, nickel, cobalt and other metals; alloy or mixture of these metals with other metals; mixture of these metals with oxide, nitride or carbide; and ferromagnetic ferrite, magnetite and a mixture thereof.

Other metals include zinc, antimony, aluminum, zinc, tin, bismuth, beryllium, manganese, selenium, tungsten, zirconium and vanadium. Oxides include iron oxide, titanium oxide and magnesium oxide. Nitrides include chromium nitride and vanadium nitride. Carbides include silicon carbide and tungsten carbide.

In view of mixing ability of the nitrile resin and magnetic powder, the magnetic powder has a particle size of preferably 0.05 to 10 $\mu$m, more preferably 0.05 to 1 $\mu$m.

Mixing proportion of the nitrile resin and the magnetic powder affects mechanical strength and magnetization property of the carrier. Too low content of the nitrile resin decreases mechanical strength of the resulting carrier. When the content of magnetic powder is too low, the carrier cannot be sufficiently magnetized in the magnetic field. In view of these matters, the magnetic powder is preferably mixed in an amount of 100 to 1,000 parts by weight, more preferably 200 to 800 parts by weight for 100 parts by weight of the nitrile resin.

In order to improve dispersing ability of the electrophotographic carrier, carbon black, silica, titanium oxide, aluminum oxide and other additives can be used. The content of these additives is preferably 0.1 to 3% by weight of the carrier.

In the preparation of electro-photographic carrier in the invention, the above nitrile resin and magnetic powder are mixed at room temperature with a ribbon blender or other mixer, heated to a temperature higher than the melting temperature of the nitrile resin, and kneaded to uniformly disperse the magnetic powder in the molten resin. Kneading temperature is generally 150 to 200° C. No particular restriction is imposed upon the heat-kneading method, and for example, a twin-screw-extruder and other known equipment can be used.

Successively, the mixture is cooled to room temperature, ground and classificated. Kneader include a feather miljet mill. The electrophotographic carrier has an average particle size of preferably 10 to 100 $\mu$m, more preferably 20 to 60 $\mu$m.

The nitrile resin for a carrier of the invention has a maximum torque of less than 4000 m·g in a processing ability test with a Brabender Plastograph shown in examples below. Consequently the resin has a low melt viscosity and can uniformly disperse the magnetic powder in the resin without applying excess load to the kneader when kneading the nitrile resin and magnetic powder by using a twin-screw extruder.

EXAMPLE

The present invention will hereafter be illustrated further in detail by way of examples and comparative examples. In these examples and comparative examples, "part" and "%" are weight basis. Following methods were used for measuring the overall conversion rate of nitrile resin, composition of matrix component, composition of rubber ingredient in the resin, glass transition temperature, weight average molecular weight of matrix component, melt index, processing ability in the carrier preparation step, amount of electrostatic charge and electrostatic charge variation of the toner which were shown in the examples and comparative examples.

(1) Overall conversion rate (% by weight)

A gas chromatograph, Model: GC-9A (manufactured by Shimadze Seisakusho Co.) was used. Polymerization liquid (latex) was analyzed at each 15 minutes from starting the polymerization. Amount of the reacted monomer was calculated from the concentration of monomer remaining in the polymerization liquid. The overall conversion rate was obtained on the basis of the whole amount of the monomer charged to the polymerization system.

(2) Composition of matrix component (% by weight)

At 25° C., 0.75 g of the resulting resin was added to 75 ml of N,N-dimethylformamide and stirred for 2 hours. Successively, 75 ml of acetonitrile was added and stirred for further an hour. The matrix component except rubber ingredient was obtained by separating the ingredient which was dissolved in the solvent. CHN content of thus obtained matrix component was determined by elementary analysis with a CHN CORDER, Model: KT-2 (manufactured by Yanagimoto Seisakusho So.) to obtain composition of acrylonitrile. The residual portion was defined as acrylate ester composition. The procedures were repeated three times and the average value was the composition of matrix component.

(3) Composition of rubber ingredient in the resin (% by weight)

At 25° C., 0.75 g of the resulting resin was added to 75 ml of N,N-dimethylformamide, stirred for 2 hours. Successively, 75 ml of acetonitrile was added and stirred for further an hour. The component which was insoluble in the solvent was separated, dried and measured weight to obtain composition of rubber ingredient in the resin.

(4) Glass transition temperature (° C.)

A differential scanning calorimeter, Model: DSC-7 (manufactured by Perkin-Elmer Co.) was used. A sample was heated to 150° C. under nitrogen atmosphere, allowed to stand for 3 minutes at the temperature, and cooled to room temperature at a temperature reduction rate of 10° C./min. The sample thus treated was heated at a temperature rise rate of 5° C./min. The glass transition temperature is an intersection temperature of the base-line extension below the glass transition temperature with a tangent exhibiting a maximum inclination between rising portion of the peak and top of the peak.

(5) Weight average molecular weight of matrix component
<Sample preparation>

At 25° C., 0.75 g of the resulting resin was added to 75 ml of N,N-dimethylformamide and stirred for 2 hours. Successively, 75 ml of acetonitrile was added and stirred for further an hour. The resin portion dissolved in the solvent was separated to obtain matrix component except rubber ingredient.
<Measuring method>

Measuring by gel permeation chromatography (hereinafter referred to as GPC) using a monodispersed polystyrene standard sample as reference.
<Measuring apparatus and conditions>

GPC: Model 150-C (manufactured by Waters Co.)

Column: Shodex: Model AD-80M/S (manufactured by Showa Denko Co.). Two column were used.

Solvent: N,N-dimethylformamide containing 0.1% by weight of lithium bromide.

Flow amount: 0.8 ml/min, column temperature: 60° C.

Sample concentration: 0.1% by weight, injection amount 200 μl.

Detector: Refractive index detection type.

(6) Melt index (g/10 min)

Measured at 150° C., under load of 21.18N by using a melt indexer, Model S-111 (manufactured by Toyo Seiki Co.) in accordance with ASTM D-1238.

(7) Processing ability (m·g)
<Sample preparation>

To 100 parts of the resin, 600 parts of magnetic powder, MFP-2 (manufactured by TDK Co.), 2 parts of carbon black, #44 (manufactured by Mitsubishi Chemical Co.), and 1.5 parts of Silica, #200, (manufactured by Nippon Aerosil Co.) were added and mixed with a Henschel mixer to prepare a sample.
<Evaluation method>

A Brabender Plastograph, Model PL-3000, (roller mixer: W-50, mixer capacity: 60 cm$^3$, manufactured by Brabender Co.) was used. At jacket temperature of 220° C., 100 g of the sample was gradually charged over 3 minutes and kneaded under rotor rotation of 30 r.p.m. Maximum torque (m·g) was measured. "x" is impossible to knead due to overload.

(8) Amount of electrostatic charge and electrostatic charge variation of the toner (μC/g).
<Preparation of carrier particle>

The sample exhibited a maximum torque of less than 4000 m·g in the above (7) was kneaded with a twin-screw extruder at 200° C., cooled to room temperature and successively subjected to coarse crushing with a feather mill crusher and further pulverized with a jet mill, Model: PJM 100 (manufactured by Nippon Neumatic Co.). The fine powder obtained was classified with a powder air classifier, Model: MDS (manufactured by Nippon Meumatic Co.) to obtain the carrier particle having an average particle size of 50 μm.
<Preparation of toner>

To 100 parts of polyester resin having a softening point of 130° C. and a glass transition temperature of 60° C., 7 parts of carbon black, #44 (manufactured by Mitsubishi Chemical Co.) and 2 parts of electrostatic charge regulator, BONTRON: S-34 (manufactured by Orient Science Co.) were added. The mixture obtained was thoroughly mixed with a ball mill, kneaded at 140° C. with a twin-screw extruder, cooled to room temperature, coarsely crushed with a feather mill crusher, and further pulverized with a jet mill, Model: PJM 100 (manufactured by Nippon Neumatic Co.). The resulting fine powder was classified with a powder air classifier, Model: MDS (manufactured by Nippon Neumatic Co.) to obtain the toner particle having an average particle size of 10 μm. To the toner particle thus obtained, 0.1% by weight of hydrophobic silica, 972 (manufactured by Nippon Aerozil Co.) was added and mixed with a Henschel mixer to obtain the desired toner particle.
<Measurement of electrostatically charged amount and electrostatic charge variation>

The above carrier particle and toner particle were mixed so as to make the mixing ratio of the latter 5% by weight, and stirred for 10 minutes and 60 minutes with a Turbula shaker mixer, Model: TURBULA Type 12C (manufactured by WAB Co.). The electrostatically charged amount was measured at 25° C. under 65% RH with a blow off powder electrostatic charge testing apparatus. Model: TB-200 (manufactured by Toshiba Chemical Co.) to obtain an electrostatically charged amount of the toner after stirring for 10 minutes [$Q_1(\mu C/g)$] and an electrostatically charged amount of the toner after stirring for 60 minutes [$Q_2(\mu C/g)$].

The absolute value of the difference between these two values $|Q_1-Q_2|$ is defined as electrostatic charge variation.

Examples 1 to 21 and Comparative Examples 1 to 12

<Preparation of rubber-like polymer>

To a stainless steel polymerization reactor, 200 parts of water, 30 parts of acrylonitrile, 70 parts of 1,3-butadiene, 2.4 parts of fatty acid soap, 0.3 part of azobisisobutyronitrile and 0.5 part of t-dodecyl mercaptan were charged, polymerized under nitrogen atmosphere with stirring at 45° C. for 20 hours, and terminated polymerization at the conversion rate of 90%. Unreacted monomer was removed by stripping under reduced pressure to obtain rubber-like polymer having a solid concentration of about 30%. The solid portion was recovered from the polymer, dried, and subjected to elementary analysis in order to obtain the content of 1,3-butadiene units and acrylonitrile units. The polymer consisted of 71% of 1,3-butadiene units and 29% acrylonitrile units.
<Preparation of nitrile resin>

To a stainless steel polymerization reactor, 150 parts of water, 0.288 part of sodium dioctylsulfosuccinate, 0.103 part of polyvinyl pyrrolidone, 0.035 part of sodium hexametaphosphate, initial addition of the monomers rubber-like polymer, and a molecular weight controller shown in Table 1 to Table 8, were charged, the temperature raised to 58° C. with stirring under nitrogen atmosphere, and stirring continued as intact for 30 minutes. Thereafter, the pH of the reaction system was regulated to 3±0.3 by addition of phosphoric acid in an amount shown in Table 1 to Table 8, and successively polymerization was initiated by the addition of an aqueous solution containing 0.08 part of potassium persulfate as a reaction initiator.

Next, 85 parts of water, 1.153 parts of sodium dioctylsulfosuccinate, 0.413 parts of polyvinyl pyrrolidone and 0.141 part of sodium hexametaphosphate were continuously added during the interval from 30 minutes to 7 hours after starting the polymerization. Polymerization was continued at 58° C. while continuously adding the post addition portion of monomer and molecular weight controller as shown in Table 1 to Table 8.

During the addition of these materials, phosphoric acid was continuously added as shown in Table 1 to Table 8 in order to maintain the polymerization system in the range of pH 2 to 4. Polymerization was finished by cooling after 8 hours from the start of polymerization.

The latex thus obtained was coagulated by adding 3.7 parts of aluminum sulfate for 100 parts of the resin contained in the latex, washed with water at 53° C. for 60 minutes, filtrated and dried at 45° C. to obtain nitrile resin powder.

Main conditions in the polymerization are shown in Table 1 to Table 8. Properties of the resulting resin were measured by the above methods, and results are shown in Table 9.
<Remarks>
Following descriptions were used in Table 1 to Table 8.

| AN | acrylonitrile |
|---|---|
| MA | methyl acrylate |
| EA | ethyl acrylate |
| ST | styrene |
| pbw | parts by weight |

Post addition starting time, post addition finishing time, interval maintained in pH 2 to 4, time for reaching overall conversion rate of 80% (or 90%) by weight . . . Any of these times mean elapsed times from the start of polymerization by addition of the initiator.

Residual monomer mixture in overall conversion rate of 80 to 90% by weight/total amount of monomer mixture added . . . Maximum and minimum values of the ratio of the remained monomer mixture in the polymerization system to the total amount of monomer mixture which was added to the polymerization system before reaching the overall conversion rate of the monomer mixture of 80 to 90%.

Consideration on the results of the examples

The carrier nitrile resin resulting from graft-copolymerization of 100 parts by weight of a monomer mixture comprising unsaturated nitrile and alkyl acrylate in the presence of 1 to 30 parts by weight of a rubber-like polymer comprising 50% by weight or more conjugated diene units, having a glass-transition temperature of 50 to 69° C. and having matrix component except rubber ingredient comprising 45 to 80% by weight of unsaturated nitrile units and 20 to 55% by weight of alkyl acrylate units, has preferably a high melt index (hereinafter referred to as MI), more preferably a MI of 2 g/10 min or more in view of processing ability in the carrier preparation step. The carrier nitrile resin is also preferred to have small electrostatic charge variation, specifically less than 4 μC/g.

When the carrier nitrile resin of the invention is used processing ability in the carrier preparation step and balance with electrostatic stability of the carrier are good. That is, the nitrile resin obtained in Example 1 to Example 21 is a resin prepared by graft-copolymerizing a monomer mixture comprising unsaturated nitrile and alkyl acrylate in the presence of a rubber-like polymer and has a glass transition temperature of 50 to 69° C. and a weight average molecular weight of matrix component except rubber ingredient of 30,000 to 150,000. Such nitrile resin has good processing ability in the carrier preparation step and good balance of electrostatic stability as a carrier.

On the other hand, the nitrile resin obtained in Comparative Examples 1 to 6 and 9 to 11 wherein the glass transition temperature and the weight average molecular weight are outside of the above range have a low melt index and poor processing ability. Comparative Example 7 exhibiting a glass transition temperature of less than 50° C. and Comparative Example 8 having a low ratio of acrylonitrile leads to large electrostatic variation and poor electrostatic stability.

TABLE 1

| | EXAMPLE | | | | |
|---|---|---|---|---|---|
| | 1 | 2 | 3 | 4 | 5 |
| Monomer mixture Total addition amount (pbw) | | | | | |
| AN | 70 | 70 | 65 | 65 | 65 |
| MA | — | — | — | — | — |
| EA | 30 | 30 | 35 | 35 | 35 |
| ST | — | — | — | — | — |
| Initial addition amount (pbw) | | | | | |
| AN | 14 | 14 | 13 | 13 | 13 |
| MA | — | — | — | — | — |
| EA | 6 | 6 | 7 | 7 | 7 |
| ST | — | — | — | — | — |
| Post addition amount (pbw) | | | | | |
| AN | 56 | 56 | 52 | 52 | 52 |
| MA | — | — | — | — | — |
| EA | 24 | 24 | 28 | 28 | 28 |
| ST | — | — | — | — | — |
| Post addition starting time (hr) | 0.5 | 0.5 | 0.5 | 0.5 | 0.5 |
| Post addition finishing time (hr) | 7 | 7 | 7 | 7 | 7 |
| Addition amount of rubber-like polymer (pbw) | 5 | 10 | 5 | 10 | 15 |
| Molecular controller | | | | | |
| Total addition amount (pbw) | 7.0 | 3.4 | 3.8 | 3.2 | 4.4 |
| Initial addition amount (pbw) | 1.4 | 0.64 | 0.76 | 0.64 | 0.88 |
| Post addition amount (pbw) | 5.6 | 2.72 | 3.04 | 2.56 | 3.52 |
| Post addition starting time (hr) | 0.5 | 0.5 | 0.5 | 0.5 | 0.5 |
| Post addition finishing time (hr) | 7 | 7 | 7 | 7 | 7 |
| $H_3PO_4$ | | | | | |
| Initial addition amount (pbw) | 0.09 | 0.10 | 0.09 | 0.10 | 0.13 |
| Post addition amount (pbw) | 0.16 | 0.16 | 0.16 | 0.16 | 0.16 |
| Post addition starting time (hr) | 0.5 | 0.5 | 0.5 | 0.5 | 0.5 |
| Post addition finishing time (hr) | 5 | 5 | 5 | 5 | 5 |
| Interval maintained in pH 2 to 4 (hr) | 7.4 | 7.5 | 7.4 | 7.4 | 7.6 |
| Residual monomer mixture in overall conversion rate of 80 to 90% by weight/Total amount of monomer mixture added | | | | | |
| Max | 0.27 | 0.29 | 0.26 | 0.30 | 0.31 |
| Min | 0.11 | 0.12 | 0.10 | 0.12 | 0.12 |
| Reaching time to Overall conversion rate of 80% (hr) | 6.3 | 6.3 | 6.3 | 6.4 | 6.5 |
| Reaching time to Overall conversion rate of 90% (hr) | 7.4 | 7.5 | 7.4 | 7.5 | 7.6 |
| Total conversion rate (wt-%) | 92.7 | 92.5 | 92.8 | 92.5 | 92.1 |
| Composition of matrix (wt-%) | | | | | |
| AN | 70 | 70 | 65 | 64 | 65 |
| MA | — | — | — | — | — |
| EA | 30 | 30 | 35 | 36 | 35 |
| ST | — | — | — | — | — |
| Composition of rubber ingredient in (wt-%) | 8 | 17 | 10 | 18 | 27 |

TABLE 2

| | EXAMPLE | | | |
|---|---|---|---|---|
| | 6 | 7 | 8 | 9 |
| Monomer mixture Total addition amount (pbw) | | | | |
| AN | 60 | 60 | 60 | 60 |
| MA | 40 | 40 | 40 | — |
| EA | — | — | — | 40 |
| ST | — | — | — | — |

TABLE 2-continued

| | EXAMPLE | | | |
|---|---|---|---|---|
| | 6 | 7 | 8 | 9 |
| Initial addition amount (pbw) | | | | |
| AN | 12 | 12 | 12 | 12 |
| MA | 8 | 8 | 8 | — |
| EA | — | — | — | 8 |
| ST | — | — | — | — |
| Post addition amount (pbw) | | | | |
| AN | 48 | 48 | 48 | 48 |
| MA | 32 | 32 | 32 | — |
| EA | — | — | — | 32 |
| ST | — | — | — | — |
| Post addition starting time (hr) | 0.5 | 0.5 | 0.5 | 0.5 |
| Post addition finishing time (hr) | 7 | 7 | 7 | 7 |
| Addition amount of rubber-like polymer (pbw) | 5 | 10 | 15 | 5 |
| Molecular controller | | | | |
| Total addition amount (pbw) | 3.6 | 6.8 | 3.8 | 3.2 |
| Initial addition amount (pbw) | 0.72 | 1.36 | 0.76 | 0.64 |
| Post addition amount (pbw) | 2.88 | 5.44 | 3.04 | 2.56 |
| Post addition starting time (hr) | 0.5 | 0.5 | 0.5 | 0.5 |
| Post addition finishing time (hr) | 7 | 7 | 7 | 7 |
| $H_3PO_4$ | | | | |
| Initial addition amount (pbw) | 0.09 | 0.10 | 0.13 | 0.09 |
| Post addition amount (pbw) | 0.16 | 0.16 | 0.16 | 0.16 |
| Post addition starting time (hr) | 0.5 | 0.5 | 0.5 | 0.5 |
| Post addition finishing time (hr) | 5 | 5 | 5 | 5 |
| Interval maintained in pH 2 to 4 (hr) | 7.3 | 7.5 | 7.5 | 7.3 |
| Residual monomer mixture in overall conversion rate of 80 to 90% by weight/ Total amount of monomer mixture added | | | | |
| Max | 0.25 | 0.31 | 0.28 | 0.28 |
| Min | 0.10 | 0.12 | 0.11 | 0.11 |
| Reaching time to Overall conversion rate of 80% (hr) | 6.4 | 6.4 | 6.4 | 6.3 |
| Reaching time to Overall conversion rate of 90% (hr) | 7.3 | 7.6 | 7.5 | 7.3 |
| Total conversion rate (wt-%) | 93.0 | 92.1 | 92.7 | 93.0 |
| Comoosition of matrix (wt-%) | | | | |
| AN | 60 | 59 | 59 | 60 |
| MA | 40 | 41 | 41 | — |
| EA | — | — | — | 40 |
| ST | — | — | — | — |
| Composition of rubber ingredient in (wt-%) | 9 | 17 | 27 | 10 |

TABLE 3

| | EXAMPLE | | | |
|---|---|---|---|---|
| | 10 | 11 | 12 | 13 |
| Monomer mixture Total addition amount (pbw) | | | | |
| AN | 60 | 60 | 55 | 55 |
| MA | — | — | 45 | 45 |
| EA | 40 | 40 | — | — |
| ST | — | — | — | — |
| Initial addition amount (pbw) | | | | |
| AN | 12 | 12 | 11 | 11 |
| MA | — | — | 9 | 9 |
| EA | 8 | 8 | — | — |
| ST | — | — | — | — |
| Post addition amount (pbw) | | | | |
| AN | 48 | 48 | 44 | 44 |
| MA | — | — | 36 | 36 |
| EA | 32 | 32 | — | — |
| ST | — | — | — | — |
| Post addition starting time (hr) | 0.5 | 0.5 | 0.5 | 0.5 |
| Post addition finishing time (hr) | 7 | 7 | 7 | 7 |
| Addition amount of rubber-like polymer (pbw) | 10 | 15 | 5 | 10 |
| Molecular controller | | | | |
| Total addition amount (pbw) | 1.6 | 3.2 | 3.6 | 2.4 |
| Initial addition amount (pbw) | 0.32 | 0.64 | 0.72 | 0.48 |
| Post addition amount (pbw) | 1.28 | 2.56 | 2.88 | 1.92 |
| Post addition starting time (hr) | 0.5 | 0.5 | 0.5 | 0.5 |
| Post addition finishing time (hr) | 7 | 7 | 7 | 7 |
| $H_3PO_4$ | | | | |
| Initial addition amount (pbw) | 0.10 | 0.13 | 0.09 | 0.10 |
| Post addition amount (pbw) | 0.16 | 0.16 | 0.16 | 0.16 |
| Post addition starting time (hr) | 0.5 | 0.5 | 0.5 | 0.5 |
| Post addition finishing time (hr) | 5 | 5 | 5 | 5 |
| Interval maintained in pH 2 to 4 (hr) | 7.3 | 7.3 | 7.4 | 7.3 |
| Residual monomer mixture in overall conversion rate of 80 to 90% by weight/ Total amount of monomer mixture added | | | | |
| Max | 0.26 | 0.25 | 0.27 | 0.26 |
| Min | 0.10 | 0.10 | 0.12 | 0.09 |
| Reaching time to Overall conversion rate of 80% (hr) | 6.7 | 6.6 | 6.5 | 6.7 |
| Reaching time to Overall conversion rate of 90% (hr) | 7.3 | 7.3 | 7.4 | 7.3 |
| Total conversion rate (wt-%) | 93.1 | 93.2 | 92.8 | 93.1 |
| Comoosition of matrix (wt-%) | | | | |
| AN | 60 | 59 | 55 | 55 |
| MA | — | — | 45 | 45 |
| EA | 40 | 41 | — | — |
| ST | — | — | — | — |
| Composition of rubber ingredient in (wt-%) | 19 | 26 | 9 | 19 |

TABLE 4

| | EXAMPLE | | | |
|---|---|---|---|---|
| | 14 | 15 | 16 | 17 |
| Monomer mixture Total addition amount (pbw) | | | | |
| AN | 55 | 50 | 50 | 50 |
| MA | 45 | 50 | 40 | 40 |
| EA | — | — | — | — |
| ST | — | — | 10 | 10 |
| Initial addition amount (pbw) | | | | |
| AN | 11 | 10 | 10 | 10 |
| MA | 9 | 10 | 8 | 8 |
| EA | — | — | — | — |
| ST | — | — | 2 | 2 |
| Post addition amount (pbw) | | | | |
| AN | 44 | 40 | 40 | 40 |
| MA | 36 | 40 | 32 | 32 |
| EA | — | — | — | — |
| ST | — | — | 8 | 8 |
| Post addition starting time (hr) | 0.5 | 0.5 | 0.5 | 0.5 |
| Post addition finishing time (hr) | 7 | 7 | 7 | 7 |
| Addition amount of rubber-like polymer (pbw) | 15 | 10 | 10 | 10 |
| Molecular controller | | | | |
| Total addition amount (pbw) | 3.6 | 2.0 | 3.6 | 3.2 |
| Initial addition amount (pbw) | 0.72 | 0.40 | 0.72 | 0.64 |

TABLE 4-continued

|  | EXAMPLE | | | |
| --- | --- | --- | --- | --- |
|  | 14 | 15 | 16 | 17 |
| Post addition amount (pbw) | 2.88 | 1.60 | 2.88 | 2.56 |
| Post addition starting time (hr) | 0.5 | 0.5 | 0.5 | 0.5 |
| Post addition finishing time (hr) | 7 | 7 | 7 | 7 |
| $H_3PO_4$ | | | | |
| Initial addition amount (pbw) | 0.13 | 0.10 | 0.10 | 0.10 |
| Post addition amount (pbw) | 0.16 | 0.16 | 0.16 | 0.16 |
| Post addition starting time (hr) | 0.5 | 0.5 | 0.5 | 0.5 |
| Post addition finishing time (hr) | 5 | 5 | 5 | 5 |
| Interval maintained in pH 2 to 4 (hr) | 7.2 | 7.5 | 7.4 | 7.4 |
| Residual monomer mixture in overall conversion rate of 80 to 90% by weight/ Total amount of monomer mixture added | | | | |
| Max | 0.25 | 0.28 | 0.27 | 0.29 |
| Min | 0.09 | 0.11 | 0.11 | 0.12 |
| Reaching time to Overall conversion rate of 80% (hr) | 6.5 | 6.6 | 6.4 | 6.6 |
| Reaching time to Overall conversion rate of 90% (hr) | 7.3 | 7.4 | 7.4 | 7.4 |
| Total conversion rate (wt-%) | 93.2 | 92.9 | 92.7 | 92.4 |
| Comoosition of matrix (wt-%) | | | | |
| AN | 54 | 49 | 49 | 49 |
| MA | 46 | 51 | 40 | 40 |
| EA | — | — | — | — |
| ST | — | — | 11 | 11 |
| Composition of rubber ingredient in (wt-%) | 26 | 19 | 18 | 18 |

TABLE 5

|  | EXAMPLE | | | |
| --- | --- | --- | --- | --- |
|  | 18 | 19 | 20 | 21 |
| Monomer mixture Total addition amount (pbw) | | | | |
| AN | 65 | 65 | 65 | 65 |
| MA | — | — | — | — |
| EA | 35 | 35 | 35 | 35 |
| ST | — | — | — | — |
| Initial addition amount (pbw) | | | | |
| AN | 11 | 16 | 13 | 13 |
| MA | — | — | — | — |
| EA | 6 | 9 | 7 | 7 |
| ST | — | — | — | — |
| Post addition amount (pbw) | | | | |
| AN | 54 | 49 | 52 | 52 |
| MA | — | — | — | — |
| EA | 29 | 26 | 28 | 28 |
| ST | — | — | — | — |
| Post addition starting time (hr) | 0.5 | 0.5 | 0.5 | 0.5 |
| Post addition finishing time (hr) | 7 | 7 | 7 | 7 |
| Addition amount of rubber-like polymer (pbw) | 10 | 10 | 10 | 10 |
| Molecular controller | | | | |
| Total addition amount (pbw) | 3.4 | 3.4 | 3.4 | 3.4 |
| Initial addition amount (pbw) | 0.68 | 0.68 | 0.34 | 1.02 |
| Post addition amount (pbw) | 2.72 | 2.72 | 3.06 | 2.38 |
| Post addition starting time (hr) | 0.5 | 0.5 | 0.5 | 0.5 |
| Post addition finishing time (hr) | 7 | 7 | 7 | 7 |
| $H_3PO_4$ | | | | |
| Initial addition amount (pbw) | 0.10 | 0.10 | 0.10 | 0.10 |
| Post addition amount (pbw) | 0.16 | 0.16 | 0.16 | 0.16 |
| Post addition starting time (hr) | 0.5 | 0.5 | 0.5 | 0.5 |
| Post addition finishing time (hr) | 5 | 5 | 5 | 5 |
| Interval maintained in pH 2 to 4 (hr) | 7.3 | 7.4 | 7.3 | 7.5 |

TABLE 5-continued

|  | EXAMPLE | | | |
| --- | --- | --- | --- | --- |
|  | 18 | 19 | 20 | 21 |
| Residual monomer mixture in overall conversion rate of 80 to 90% by weight/ Total amount of monomer mixture added | | | | |
| Max | 0.28 | 0.26 | 0.26 | 0.32 |
| Min | 0.12 | 0.10 | 0.10 | 0.14 |
| Reaching time to Overall conversion rate of 80% (hr) | 6.6 | 6.4 | 6.4 | 6.7 |
| Reaching time to Overall conversion rate of 90% (hr) | 7.4 | 7.4 | 7.4 | 7.6 |
| Total conversion rate (wt-%) | 92.8 | 92.9 | 92.9 | 91.9 |
| Comoosition of matrix (wt-%) | | | | |
| AN | 65 | 64 | 65 | 65 |
| MA | — | — | — | — |
| EA | 35 | 36 | 35 | 35 |
| ST | — | — | — | — |
| Composition of rubber ingredient in (wt-%) | 17 | 19 | 20 | 16 |

TABLE 6

|  | COMPARATIVE EXAMPLE | | | |
| --- | --- | --- | --- | --- |
|  | 1 | 2 | 3 | 4 |
| Monomer mixture Total addition amount (pbw) | | | | |
| AN | 75 | 75 | 65 | 55 |
| MA | 25 | 25 | 35 | 45 |
| EA | — | — | — | — |
| ST | — | — | — | — |
| Initial addition amount (pbw) | | | | |
| AN | 15 | 15 | 13 | 11 |
| MA | 5 | 5 | 7 | 9 |
| EA | — | — | — | — |
| ST | — | — | — | — |
| Post addition amount (pbw) | | | | |
| AN | 60 | 60 | 52 | 44 |
| MA | 20 | 20 | 28 | 36 |
| EA | — | — | — | — |
| ST | — | — | — | — |
| Post addition starting time (hr) | 0.5 | 0.5 | 0.5 | 0.5 |
| Post addition finishing time (hr) | 7 | 7 | 7 | 7 |
| Addition amount of rubber-like polymer (pbw) | 10 | 10 | 10 | 10 |
| Molecular controller | | | | |
| Total addition amount (pbw) | 1.6 | 3.2 | 3.2 | 1.0 |
| Initial addition amount (pbw) | 0.32 | 0.64 | 0.64 | 0.20 |
| Post addition amount (pbw) | 1.28 | 2.56 | 2.56 | 0.80 |
| Post addition starting time (hr) | 0.5 | 0.5 | 0.5 | 0.5 |
| Post addition finishing time (hr) | 7 | 7 | 7 | 7 |
| $H_3PO_4$ | | | | |
| Initial addition amount (pbw) | 0.10 | 0.10 | 0.10 | 0.10 |
| Post addition amount (pbw) | 0.16 | 0.16 | 0.16 | 0.16 |
| Post addition starting time (hr) | 0.5 | 0.5 | 0.5 | 0.5 |
| Post addition finishing time (hr) | 5 | 5 | 5 | 5 |
| Interval maintained in pH 2 to 4 (hr) | 7.2 | 7.3 | 7.4 | 7.3 |
| Residual monomer mixture in overall conversion rate of 80 to 90% by weight/ Total amount of monomer mixture added | | | | |
| Max | 0.26 | 0.31 | 0.30 | 0.25 |
| Min | 0.10 | 0.12 | 0.12 | 0.10 |
| Reaching time to Overall conversion rate of 80% (hr) | 6.6 | 6.8 | 6.8 | 6.6 |
| Reaching time to Overall conversion rate of 90% (hr) | 7.4 | 7.5 | 7.5 | 7..3 |

TABLE 6-continued

| | COMPARATIVE EXAMPLE | | | |
|---|---|---|---|---|
| | 1 | 2 | 3 | 4 |
| Total conversion rate (wt-%) | 92.8 | 92.1 | 92.3 | 93.1 |
| Comoosition of matrix (wt-%) | | | | |
| AN | 74 | 75 | 65 | 55 |
| MA | 26 | 25 | 35 | 45 |
| EA | — | — | — | — |
| ST | — | — | — | — |
| Composition of rubber ingredient in (wt-%) | 20 | 19 | 19 | 20 |

TABLE 7

| | COMPARATIVE EXAMPLE | | | |
|---|---|---|---|---|
| | 6 | 7 | 8 | 9 |
| Monomer mixture | | | | |
| Total addition amount (pbw) | | | | |
| AN | 85 | 75 | 50 | 20 |
| MA | 15 | 10 | — | — |
| EA | — | — | 50 | 35 |
| ST | — | 15 | — | 45 |
| Initial addition amount (pbw) | | | | |
| AN | 17 | 15 | 10 | 4 |
| MA | 3 | 2 | — | — |
| EA | — | — | 10 | 7 |
| ST | — | 3 | — | 9 |
| Post addition amount (pbw) | | | | |
| AN | 68 | 60 | 40 | 16 |
| MA | 12 | 8 | — | — |
| EA | — | — | 40 | 28 |
| ST | — | 12 | — | 36 |
| Post addition starting time (hr) | 0.5 | 0.5 | 0.5 | 0.5 |
| Post addition finishing time (hr) | 7 | 7 | 7 | 7 |
| Addition amount of rubber-like polymer (pbw) | 10 | 10 | 10 | 10 |
| Molecular controller | | | | |
| Total addition amount (pbw) | 3.2 | 1.5 | 3.2 | 3.2 |
| Initial addition amount (pbw) | 0.64 | 0.30 | 0.64 | 0.64 |
| Post addition amount (pbw) | 2.56 | 1.20 | 2.56 | 2.56 |
| Post addition starting time (hr) | 0.5 | 0.5 | 0.5 | 0.5 |
| Post addition finishing time (hr) | 7 | 7 | 7 | 7 |
| $H_3PO_4$ | | | | |
| Initial addition amount (pbw) | 0.10 | 0.10 | 0.10 | 0.10 |
| Post addition amount (pbw) | 0.16 | 0.16 | 0.16 | 0.16 |
| Post addition starting time (hr) | 0.5 | 0.5 | 0.5 | 0.5 |
| Post addition finishing time (hr) | 5 | 5 | 5 | 5 |
| Interval maintained in pH 2 to 4 (hr) | 7.3 | 7.3 | 7.3 | 7.3 |
| Residual monomer mixture in overall conversion rate of 80 to 90% by weight/ Total amount of monomer mixture added | | | | |
| Max | 0.28 | 0.27 | 0.26 | 0.24 |
| Min | 0.11 | 0.11 | 0.10 | 0.09 |
| Reaching time to Overall conversion rate of 80% (hr) | 6.8 | 6.9 | 6.5 | 6.6 |
| Reaching time to Overall conversion rate of 90% (hr) | 7.4 | 7.4 | 7.3 | 7.3 |
| Total conversion rate (wt-%) | 92.7 | 92.9 | 93.1 | 93.2 |
| Comoosition of matrix (wt-%) | | | | |
| AN | 84 | 74 | 49 | 19 |
| MA | 16 | 10 | — | — |
| EA | — | — | 51 | 353 |

TABLE 7-continued

| | COMPARATIVE EXAMPLE | | | |
|---|---|---|---|---|
| | 6 | 7 | 8 | 9 |
| ST | — | 16 | — | 46 |
| Composition of rubber ingredient in (wt-%) | 18 | 20 | 18 | 18 |

TABLE 8

| | COMPARATIVE EXAMPLE | | | |
|---|---|---|---|---|
| | 9 | 10 | 11 | 12 |
| Monomer mixture | | | | |
| Total addition amount (pbw) | | | | |
| AN | 70 | 70 | 70 | 70 |
| MA | .. | — | — | — |
| EA | 30 | 30 | 30 | 30 |
| ST | — | — | — | — |
| Initial addition amount (pbw) | | | | |
| AN | 14 | 14 | 14 | 14 |
| MA | — | — | — | — |
| EA | 6 | 6 | 6 | 6 |
| ST | — | — | — | — |
| Post addition amount (pbw) | | | | |
| AN | 56 | 56 | 56 | 56 |
| MA | .. | — | — | — |
| EA | 24 | 24 | 24 | 24 |
| ST | — | — | — | — |
| Post addition starting time (hr) | 0.5 | 0.5 | 0.5 | 0.5 |
| Post addition finishing time (hr) | 7 | 7 | 7 | 7 |
| Addition amount of rubber-like polymer (pbw) | 10 | 10 | 10 | 10 |
| Molecular controller | | | | |
| Total addition amount (pbw) | 3.4 | 3.4 | 1.9 | 3.4 |
| Initial addition amount (pbw) | 0 | 0.03 | 0.68 | 0.68 |
| Post addition amount (pbw) | 3.40 | 3.37 | 1.22 | 2.72 |
| Post addition starting time (hr) | 0.5 | 0.5 | 0.5 | 0.5 |
| Post addition finishing time (hr) | 7 | 7 | 3.5 | 7 |
| $H_3PO_4$ | | | | |
| Initial addition amount (pbw) | 0.10 | 0.10 | 0.10 | 0.10 |
| Post addition amount (pbw) | 0.16 | 0.16 | 0.16 | 0.05 |
| Post addition starting time (hr) | 0.5 | 0.5 | 0.5 | 0.5 |
| Post addition finishing time (hr) | 5 | 5 | 5 | 2 |
| Interval maintained in pH 2 to 4 (hr) | 7.3 | 7.3 | 7.3 | 3.4 |
| Residual monomer mixture in overall conversion rate of 80 to 90% by weight/ Total amount of monomer mixture added | | | | |
| Max | 0.26 | 0.25 | 0.24 | 0.23 |
| Min | 0.10 | 0.10 | 0.09 | 0.09 |
| Reaching time to Overall conversion rate of 80% (hr) | 6.4 | 6.4 | 6.2 | 6.1 |
| Reaching time to Overall conversion rate of 90% (hr) | 7.4 | 7.3 | 7.3 | 7.3 |
| Total conversion rate (wt-%) | 92.9 | 93.0 | 93.2 | 93.5 |
| Comoosition of matrix (wt-%) | | | | |
| AN | 70 | 69 | 70 | 69 |
| MA | .. | — | — | — |
| EA | 30 | 31 | 30 | 31 |
| ST | — | — | — | — |
| Composition of rubber ingredient in (wt-%) | 23 | 22 | 21 | 22 |

TABLE 2

| | Tg (° C.) | Mw (× 10⁴) | MI (g/10 min) | Torque$_{MAX}$ (× 10³m.g) | Q($\mu$C/g) $Q_1$ | $Q_2$ | $|Q_1-Q_2|$ |
|---|---|---|---|---|---|---|---|
| Example | | | | | | | |
| 1 | 65.7 | 3.3 | 12 | 2.6 | −22.2 | −24.8 | 2.6 |
| 2 | 68.8 | 7.5 | 2 | 3.7 | −23.0 | −24.9 | 1.9 |
| 3 | 60.1 | 5.8 | 9 | 3.1 | −21.6 | −23.9 | 2.3 |
| 4 | 62.3 | 8.3 | 3 | 3.7 | −21.7 | −24.2 | 2.5 |
| 5 | 62.1 | 6.3 | 5 | 3.5 | −21.8 | −24.4 | 2.6 |
| 6 | 64.4 | 6.1 | 5 | 3.3 | −22.8 | −25.2 | 2.4 |
| 7 | 60.3 | 3.6 | 18 | 2.3 | −22.5 | −24.9 | 2.4 |
| 8 | 65.2 | 6.9 | 3 | 3.7 | −24.3 | −26.8 | 2.5 |
| 9 | 53.9 | 6.5 | 12 | 2.5 | −20.8 | −23.6 | 2.8 |
| 10 | 59.5 | 14 | 2 | 3.8 | −22.4 | −25.2 | 2.8 |
| 11 | 54.5 | 7.4 | 5 | 3.3 | −21.5 | −24.1 | 2.6 |
| 12 | 60.2 | 6.1 | 10 | 2.8 | −25.0 | −27.9 | 2.9 |
| 13 | 64.5 | 10 | 2 | 3.8 | −25.1 | −27.9 | 2.8 |
| 14 | 62.2 | 7.4 | 4 | 3.5 | −24.9 | −27.8 | 2.9 |
| 15 | 60.1 | 12 | 3 | 3.7 | −24.3 | −27.4 | 3.1 |
| 16 | 66.6 | 7.3 | 4 | 3.6 | −23.6 | −27.1 | 3.5 |
| 17 | 67.8 | 8.4 | 3 | 3.7 | −24.1 | −27.7 | 3.6 |
| 18 | 61.9 | 7.6 | 4 | 3.3 | −21.8 | −24.4 | 2.6 |
| 19 | 62.0 | 7.7 | 4 | 3.4 | −21.9 | −24.4 | 2.5 |
| 20 | 61.8 | 7.6 | 4 | 3.3 | −23.2 | −25.7 | 2.5 |
| 21 | 62.1 | 7.8 | 3 | 3.5 | −22.8 | −25.2 | 2.4 |
| Comparative Example | | | | | | | |
| 1 | 81.2 | 14 | 0 | X | | | |
| 2 | 76.5 | 8.0 | 0 | X | | | |
| 3 | 70.2 | 8.6 | 1 | 4.8 | | | |
| 4 | 68.5 | 18 | 0 | X | | | |
| 5 | 90.5 | 7.6 | 0 | X | | | |
| 6 | 92.1 | 14 | 0 | X | | | |
| 7 | 43.5 | 7.7 | 20 | 2.2 | −20.1 | −26.3 | 6.2 |
| 8 | 62.8 | 7.6 | 5 | 2.9 | −19.2 | −23.6 | 4.4 |
| 9 | 69.4 | 8.7 | 1 | 4.5 | | | |
| 10 | 69.4 | 8.6 | 1 | 4.4 | | | |
| 11 | 69.4 | 12 | 0 | 5.0 | | | |
| 12 | 70.4 | 16 | 0 | X | | | |

What is claimed is:

1. An electrophotographic carrier comprising 100 to 1000 parts by weight of a magnetic powder and 100 parts by weight of a nitrile resin as a carrier, said nitrile resin comprising a matrix component and a rubber polymer, said nitrile resin resulting from graft-copolymerization of 100 parts by weight of a monomer mixture comprising unsaturated nitrile and alkyl acrylate which forms the matrix component in the presence of 1 to 30 parts by weight of a rubber polymer comprising 50% by weight or more of conjugated diene units, said nitrile resin having a glass transition temperature of 50 to 69° C., wherein the matrix component comprises 45 to 80% by weight of unsaturated nitrile units based on the total weight of the matrix component and 20 to 55% by weight of alkyl acrylate units based on the total weight of the matrix component and has a weight average molecular weight of 30,000 to 150,000.

2. The electrophotographic carrier according to claim 1, wherein the rubber polymer comprising 50% by weight or more of conjugated diene units is one or more polymers selected from a 1,3-butadiene homopolymer, 1,3-butadiene/acrylonitrile copolymer and 1,3-butadiene/styrene copolymer.

3. The electrophotographic for a carrier according to claim 1, wherein the unsaturated nitrile is one or more monomers selected from acrylonitrile and methacrylonitrile.

4. The electrophotographic for a carrier according to claim 1, wherein the alkyl acrylate is one or more monomers selected from methyl acrylate and ethyl acrylate.

5. The electrophotographic for a carrier according to claim 1, wherein the matrix component ingredient comprises 20% by weight or less of monomer units which are copolymerizable with unsaturated nitrile and alkyl acrylate.

6. The electrophotographic carrier according to claim 5, wherein the monomer which is copolymerizable with unsaturated nitrile and alkyl acrylate is styrene.

7. The electrophotographic for a carrier according to claim 1, wherein the nitrile resin for a carrier comprises 1 to 50% by weight of the rubber ingredient.

8. The electrophotographic carrier according to claim 1, wherein a matrix component comprises 50 to 80% by weight of unsaturated nitrile units and 20 to 50% by weight of alkyl acrylate units.

9. The electrophotographic carrier according to claim 1, wherein the matrix component has a weight average molecular weight of 30,000 to 90,000.

* * * * *

UNITED STATES PATENT AND TRADEMARK OFFICE
CERTIFICATE OF CORRECTION

PATENT NO. : 6,100,001
DATED : August 8, 2000
INVENTOR(S) : Makoto Someda et al

Page 1 of 1

It is certified that error appears in the above-identified patent and that said Letters Patent is hereby corrected as shown below:

<u>Column 22,</u>
Line 19, delete "for a";
Line 22, delete "for a";
Line 25, delete "for a";
Line 32, delete "for a".

Signed and Sealed this

Twelfth Day of June, 2001

*Attest:*

*Nicholas P. Godici*

*Attesting Officer*

NICHOLAS P. GODICI
*Acting Director of the United States Patent and Trademark Office*